(12) United States Patent
Saito et al.

(10) Patent No.: US 9,534,655 B2
(45) Date of Patent: Jan. 3, 2017

(54) VIBRATION DAMPING DEVICE

(71) Applicant: BRIDGESTONE CORPORATION, Tokyo (JP)

(72) Inventors: Hajime Saito, Yokohama (JP); Junko Tanaka, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/400,692

(22) PCT Filed: May 21, 2013

(86) PCT No.: PCT/JP2013/064053
§ 371 (c)(1),
(2) Date: Nov. 12, 2014

(87) PCT Pub. No.: WO2013/176117
PCT Pub. Date: Nov. 28, 2013

(65) Prior Publication Data
US 2015/0123327 A1 May 7, 2015

(30) Foreign Application Priority Data

May 24, 2012 (JP) .................................. 2012-118499

(51) Int. Cl.
*F16M 9/00* (2006.01)
*F16F 13/08* (2006.01)
*F16F 13/18* (2006.01)

(52) U.S. Cl.
CPC ............... *F16F 13/08* (2013.01); *F16F 13/18* (2013.01)

(58) Field of Classification Search
CPC ........ F16F 13/106; F16F 13/10; F16F 13/107; F16F 13/102; F16F 13/1463

(Continued)

(56) References Cited

U.S. PATENT DOCUMENTS

2002/0000688 A1 1/2002 Simuttis et al.
2006/0091594 A1* 5/2006 Miyahara .............. F16F 1/3849
267/140.13

(Continued)

FOREIGN PATENT DOCUMENTS

CN 101981342 A 2/2011
CN 102395811 A 3/2012

(Continued)

OTHER PUBLICATIONS

International Search Report of PCT/JP2013/064053 dated Jun. 25, 2013 [PCT/ISA/210].

(Continued)

*Primary Examiner* — Robert A Siconolfi
*Assistant Examiner* — Mahbubur Rashid
(74) *Attorney, Agent, or Firm* — Sughrue Mion, PLLC (57) ABSTRACT

A vibration damping device includes: a cylindrical first attachment member and a second attachment member; and an annular first elastic body and an annular second elastic body, wherein, a liquid chamber is formed between the elastic bodies, elastic division walls that divide the liquid chamber into a plurality of pressure receiving liquid chambers are arranged, wherein the elastic division wall is joined to the first elastic body, and is also in abutment with the second elastic body, wherein the second attachment member is divided in the axial direction into: a first divided body to which an inner peripheral edge portion of the first elastic body is joined; and a second divided body to which an inner peripheral edge portion of the second elastic body is joined, and wherein the inner peripheral edge portions of the elastic bodies are located side by side in the axial O direction.

3 Claims, 3 Drawing Sheets

(58) Field of Classification Search
USPC .................................................. 267/140.13
See application file for complete search history.

(56) References Cited

U.S. PATENT DOCUMENTS

| | | | | |
|---|---|---|---|---|
| 2010/0264569 A1* | 10/2010 | Kojima | ................... | F16F 13/18 267/140.11 |
| 2011/0042870 A1* | 2/2011 | Kojima | ................... | F16F 13/10 267/140.11 |
| 2013/0175745 A1* | 7/2013 | Kojima | ................ | F16F 13/108 267/140.13 |

FOREIGN PATENT DOCUMENTS

| | | | |
|---|---|---|---|
| CN | 102472354 | A | 5/2012 |
| EP | 1160483 | A2 | 12/2001 |
| JP | 2005282693 | A | 10/2005 |
| JP | 2007-278399 | A | 10/2007 |
| JP | 2012-087887 | A | 5/2012 |
| WO | 2010/126060 | A1 | 11/2010 |

OTHER PUBLICATIONS

Written Opinion of PCT/JP2013/064053 dated Jun. 25, 2013 [PCT/ISA/237].

Communication dated Jun. 30, 2015 from the State Intellectual Property Office of People's Republic of China in counterpart Application No. 201380026068.0.

* cited by examiner

VIBRATION DAMPING DEVICE

CROSS REFERENCE TO RELATED APPLICATIONS

This application is a National Stage of International Application No. PCT/JP2013/064053, filed May 21, 2013, claiming priority based on Japanese Patent Application No. 2012-118499, filed May 24, 2012, the contents of all of which are incorporated herein by reference in their entirety.

TECHNICAL FIELD

The present invention relates to a vibration damping device that is applied to, for example, automobiles, industrial machines, and the like for absorbing and damping the vibration from a vibration generating unit such as an engine.

BACKGROUND ART

Conventionally, a vibration damping device is known that includes: a cylindrical first attachment member that is joined to either one of a vibration generating unit and a vibration receiving unit; a second attachment member that is joined to the other; and elastic bodies that join the attachment members, as is shown in, for example, Patent Document 1 below.

The elastic body includes a first elastic body and a second elastic body, both having an annular shape and being spaced from each other in an axial direction. Between the first and second elastic bodies, a liquid chamber is formed, and also a plurality of elastic division walls, which divide the liquid chamber into a plurality of pressure receiving liquid chambers, are arranged in a circumferentially spaced manner, the pressure receiving liquid chambers being in communication with each other though a restriction passage. The elastic division walls are joined to the first elastic body and are also in abutment with the second elastic body. The second attachment member is axially divided into: a first division body to which an inner peripheral edge portion of the first elastic body is joined; and a second division body to which an inner peripheral edge portion of the second elastic body is joined.

CITATION LIST

Patent Document 1: Japanese Unexamined Patent Application, First Publication No. 2007-278399

However, in the above-mentioned vibration damping device, a joint of the elastic division wall to the first elastic body reinforces the first elastic body, making the first elastic body less deformable in the axial direction than the second elastic body. Therefore, when the attachment members are relatively displaced in the axial direction as a result of a load input in the axial direction, the amount of displacement in the inner peripheral edge portion of the first elastic body is likely to be less than the amount of displacement in the inner peripheral edge portion of the second elastic body. Consequently, there is a possibility that the radially inner end portion of the elastic division wall and the inner peripheral edge portion of the second elastic body are spaced from each other in the axial direction, forming a gap between them, through which circumferentially-adjacent pressure receiving liquid chambers are in communication with each other. In this case, it is difficult for the liquid to flow along the restriction passage, thus making it difficult to exhibit the damping property.

DISCLOSURE OF INVENTION

The present invention has been achieved in view of the aforementioned circumstances, and has an object to provide a vibration damping device capable of reliably exhibiting the damping property.

A first aspect of a vibration damping device according to the present invention includes: a cylindrical first attachment member that is joined to one of a vibration generating unit and a vibration receiving unit, and a second attachment member that is joined to the other; and an elastic body that joins the first attachment member with the second attachment member, wherein the elastic body comprises: an annular first elastic body and an annular second elastic body that are spaced from each other in an axial direction, wherein, a liquid chamber in which liquid is enclosed is formed between the elastic bodies, and a plurality of elastic division walls that divide the liquid chamber into a plurality of pressure receiving liquid chambers are arranged in a circumferentially spaced manner, the pressure receiving liquid chambers being in communication with one another through a restriction passage, wherein the elastic division wall is joined to the first elastic body, and is also in abutment with the second elastic body, wherein the second attachment member is divided in the axial direction into: a first divided body to which an inner peripheral edge portion of the first elastic body is joined; and a second divided body to which an inner peripheral edge portion of the second elastic body is joined, wherein the inner peripheral edge portions of the elastic bodies are located side by side in the axial direction, and wherein the first divided body is provided with restriction portions to which the inner peripheral edge portion of the first elastic body is joined from radially outward, which are arranged so as to overlap a radially inner end of the elastic division walls in the axial direction, and the radially inner end of the elastic division wall is sandwiched between the restriction portions and an inner peripheral edge portion of the second elastic body.

According to this, the first divided body is provided with the restriction portions. Therefore, when a load is input in the axis line direction and the attachment members are relatively displaced in the axis line direction, it is possible to displace the radially inner end portion of the elastic division walls in the axis line direction while the radially inner end portion of the elastic division walls is sandwiched between the restriction portion of the first divided body and the inner peripheral edge portion of the second elastic body. This makes it possible to prevent the radially inner end portion of the elastic division wall and the inner peripheral edge portion of the second elastic body from being spaced away in the axis line direction, thus suppressing the production of a gap between the two. Therefore, it is possible to reliably exhibit the damping property.

Furthermore, the inner peripheral edge portions of the elastic bodies are located side by side in the axis line direction. Therefore, it is possible to decrease the size of the radial end portion of the elastic division wall along the axis line direction, and keep the rigidity of the end portion in the axis line direction low. As a result, when a load is input in the axis line direction and the attachment members are relatively displaced in the axis line direction, it is possible to reliably suppress the production of the gap.

Furthermore, the restriction portion may extend in the axial direction, and the inner peripheral edge portion of the first elastic body may be joined to an end portion on an elastic division wall side of the restriction portions along the axial direction, and a chamfer may be formed at the end portion on the elastic division wall side of the restriction portions.

In this case, the chamfer is formed at the end portion on the elastic division wall side of the restriction portion. Therefore, compared with the case where the chamfer is not formed, it is possible to make it easy to secure the radial length of the first elastic body. As a result, it is possible to exhibit the performance of the first elastic body for a long period of time while the deterioration of the first elastic body is being suppressed.

Furthermore, the restriction portion may be formed by a portion of the first divided body that corresponds circumferentially to the elastic division wall being protruded outwardly in a radial direction.

In this case, the restriction portions are formed by the portions of the first divided body that corresponds circumferentially to the elastic division walls being protruded outwardly in the radial direction. Therefore, it is possible to make it easy to secure the radial length of the first elastic body in portions that avoid the portions of the first divided body circumferentially corresponding to the elastic division walls. As a result, it is possible to exhibit the performance of the first elastic body for a long period of time while the deterioration of the first elastic body is being suppressed.

Advantageous Effects of the Invention

According to the vibration damping device of the present invention, it is possible to reliably exhibit the damping property.

BEST MODE FOR CARRYING OUT THE INVENTION

Hereunder is a description of a vibration damping device according to an embodiment of the present invention with reference to the drawings.

Figure 1:
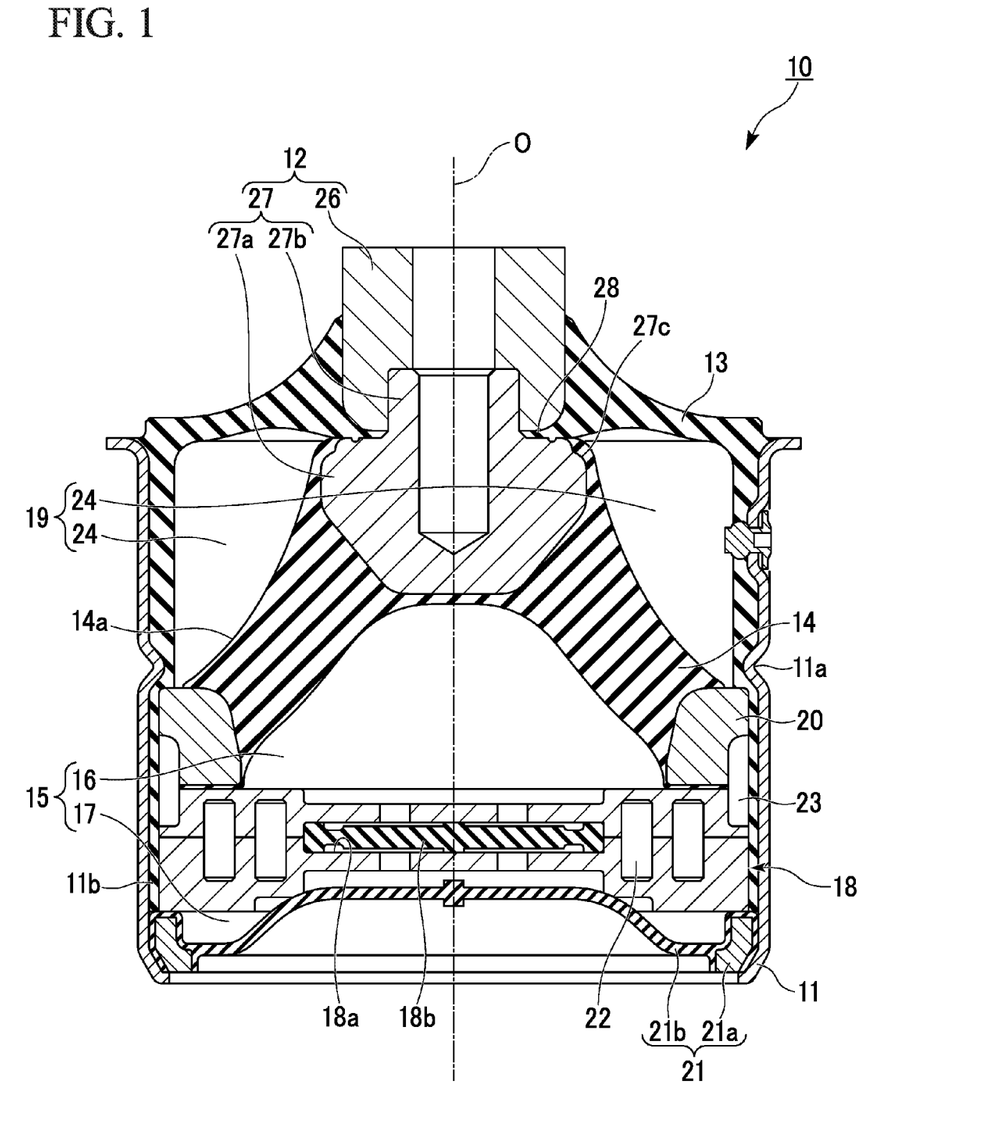
FIG. 1 is a longitudinal cross-sectional view of a vibration damping device according to an embodiment of the present invention.

As shown in FIG. 1, a vibration damping device 10 includes: a cylindrical first attachment member 11 that is joined to either one of a vibration generating unit and a vibration receiving unit; a second attachment member 12 that is joined to the other: elastic bodies 13, 14 that elastically join the attachment members 11, 12; and a partition member 18 that defines, in an axis line O direction, an enclosed liquid chamber 15 in the first attachment member 11 in which liquid is enclosed, to thereby form a main liquid chamber 16, which has the elastic bodies 13, 14 as parts of its wall surface, and a sub liquid chamber 17. The vibration damping device 10 is the so-called liquid enclosure type in which, for example, ethylene glycol, water, silicone oil, or the like is enclosed as the liquid.

Here, the first attachment member 11, the second attachment member 12, the elastic bodies 13, 14, and the partition member 18 are coaxially arranged with a central axis line as their common axis. Hereinafter, the common axis will be referred to as an axis line O. Along the axis line O, the main liquid chamber 16 side of the partition member 18 will be referred to as a first side of the vibration damping device 10, and the sub liquid chamber 17 side of the partition member 18 will be referred to as a second side of the vibration damping device 10. The direction orthogonal to the axis line O will be referred to as a radial direction, and the direction about the axis line O will be referred to as a circumferential direction. In an installation condition where the vibration damping device 10 is joined to each of a vibration generating unit and a vibration receiving unit, the bound side of the vibration damping device 10 to which a static load (initial load) is input is the second side of the vibration damping device 10 while the rebound side of the vibration damping device 10, which is opposite in the input direction of the static load, is the first side of the vibration damping device 10.

At the central portion of the first attachment member 11 in the axis line O direction, a narrowed portion 11a that recesses internally in the radial direction extends over the whole periphery in the circumferential direction. An inner peripheral surface of the first attachment member 11 is coated with a coating film 11b. The coating film 11b is spread while avoiding the end portion of the first attachment member 11 on the second side of the vibration damping device 10. Note that the first attachment member 11 may have a circular shape or a polygonal shape when seen in a planar view in the axis line O direction.

The second attachment member 12 is formed into a bottomed cylinder whose inner portion has a threaded hole and is displaced to the first side of the vibration damping device 10 with respect to the first attachment member 11. The outer diameter of the second attachment member 12 is less than that of the first attachment member 11. The second attachment member 12 is positioned on the radially inner side of the first attachment member 11. The second attachment member 12 protrudes toward the first side of the vibration damping device 10 from within the end portion of the first attachment member 11 on the first side of the vibration damping device 10.

The elastic bodies 13, 14 include: an annular first-side elastic body (first elastic body) 13; and an annular second-side elastic body (second elastic body) 14, the elastic bodies being spaced from each other in the axis line O direction. The elastic bodies 13, 14 are formed of an elastic body material that is made of, for example, rubber material, synthetic resin material, or the like. The elastic bodies 13, 14 are arranged coaxially with the axis line O. Between the elastic bodies 13, 14, there is formed a liquid chamber 19 (annular liquid chamber) in which liquid is enclosed.

An outer peripheral edge portion of the first-side elastic body 13 is joined to the edge portion of the first attachment member 11 on the first side of the vibration damping device 10 via a coating film 11b. The size of the first-side elastic body 13 along the axis line O direction is gradually larger from the outer side to the inner side in the radial direction. Namely, the first-side elastic body 13 gradually protrudes further toward the first side of the vibration damping device 10 from the outer side to the inner side in the radial direction, to thereby have a larger size along the axis line O direction. The first-side elastic body 13 covers an end portion of the first attachment member 11 on the first side of the vibration damping device 10.

An outer peripheral edge portion of the second-side elastic body 14 is joined to an inner peripheral surface of a ring member 20 that is fitted, via the coating film 11b, into a portion of the first attachment member 11 at a position close to the second side of the vibration damping device 10 than the narrowed portion 11a. The second-side elastic body 14 gradually extends toward the first side of the vibration damping device 10 from the outer side to the inner side in the radial direction. In the second-side elastic body 14, a formation surface 14a that faces to the first side of the vibration damping device 10 and forms the liquid chamber 19 is formed into a concave curved surface that concaves toward the second side of the vibration damping device 10.

Here, an end of the first attachment member 11 on the second side of the vibration damping device 10 is covered by a diaphragm 21. The diaphragm 21 includes: a diaphragm ring 21a that is fitted into the end portion of the first attachment member 11 on the second side of the vibration damping device 10; and a film-like diaphragm rubber 21b that covers an internal portion of the diaphragm ring 21a. The diaphragm rubber 21b has its outer peripheral edge portion cure-adhered to an inner peripheral surface of the diaphragm ring 21a, thus having a shape of an inverted bowl.

In the first attachment member 11, the space between the diaphragm 21 and the second-side elastic body 14 is the enclosed liquid chamber 15.

The partition member 18 is sandwiched between the diaphragm ring 21a and the ring member 20 in the axis line O direction, and is also fitted into the first attachment member 11 via the coating film 11b. In the illustration shown in the figure, the partition member 18 is provided with a container chamber 18a that is in communication with each of the main liquid chamber 16 and the sub liquid chamber 17 via through-holes that open in the axis line O direction. The container chamber 18a contains a movable plate 18b capable of being displaced in the axis line O direction in accordance with a pressure difference between the main liquid chamber 16 and the sub liquid chamber 17.

In the enclosed liquid chamber 15, the space between the partition member 18 and the second-side elastic body 14 is the main liquid chamber 16 while the space between the partition member 18 and the diaphragm 21 is the sub liquid chamber 17. The main liquid chamber 16 has its inner volume changed by a deformation of the second-side elastic body 14. The sub liquid chamber 17 has its inner volume changed by a deformation of the diaphragm rubber 21b of the diaphragm 21.

The main liquid chamber 16 and the sub liquid chamber 17 are in communication with each other through an orifice passage 22.

The orifice passage 22 is provided in the partition member 18. A length and a cross-sectional area of the flow passage of the orifice passage 22 are set (tuned) so that the resonant frequency of the orifice passage 22 is a predetermined frequency. As the predetermined frequency, for example a frequency of an idle vibration (for example, frequency: 18 Hz to 30 Hz, amplitude: ±0.5 mm or less), a shake vibration whose frequency is lower than that of an idle vibration (for example, frequency: 14 Hz or less, amplitude: above ±0.5 mm), or the like can be listed. The number of the orifice passages 22 may be one or more than one. In the case of more than one orifice passage, the resonant frequencies may be different from one another.

Figure 2:
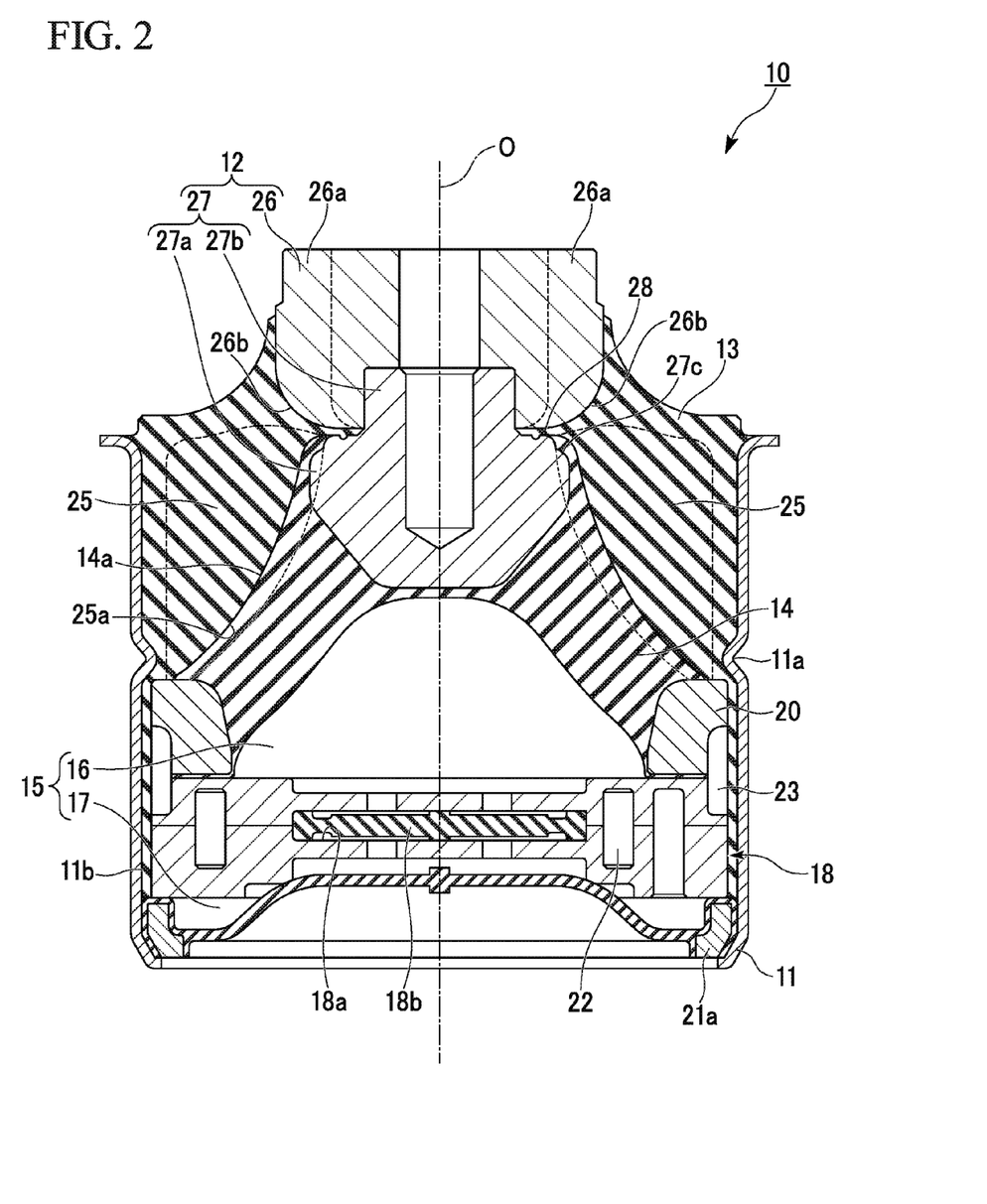
FIG. 2 is another longitudinal cross-sectional view of the vibration damping device shown in FIG. 1.
Figure 3:
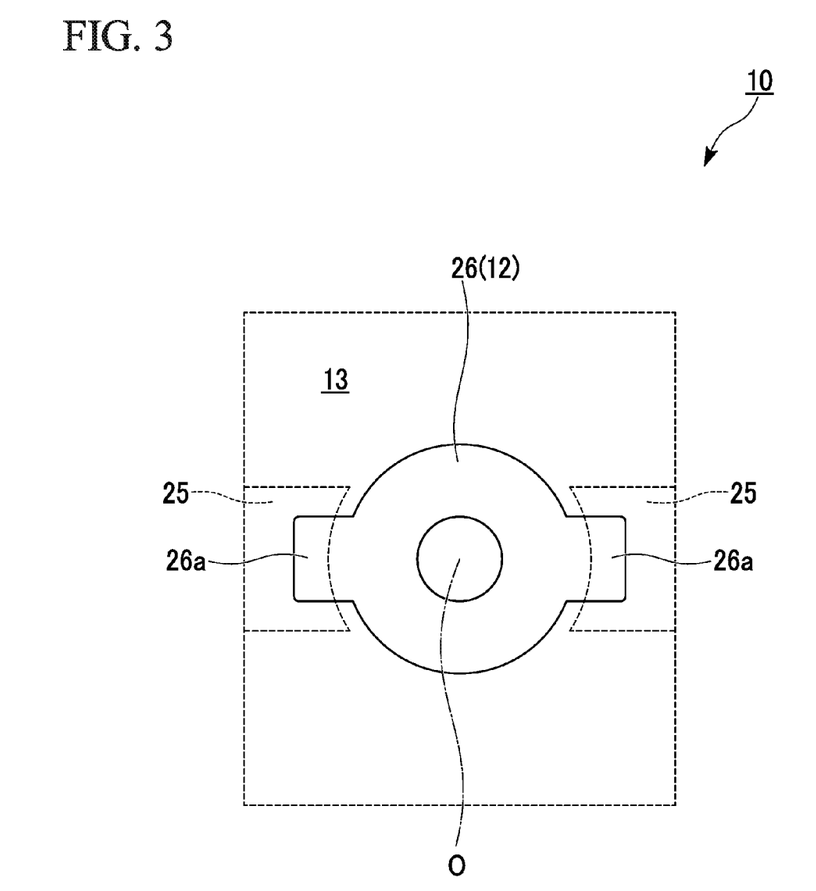
FIG. 3 is a plan view of the main part of the vibration damping device shown in FIG. 1.

Here, as shown in FIG. 2 and FIG. 3, between the elastic bodies 13, 14, a plurality of elastic division walls 25, which divide the liquid chamber 19 into a plurality of pressure receiving liquid chambers 24 in communication with one another through the restriction passage 23, are arranged in a circumferentially spaced manner. Two elastic division walls 25 are provided radially across the axis line O, and have an identical shape and size. The elastic division walls 25 divide the liquid chamber 19 into two pressure receiving liquid chambers 24 with an identical shape and size. The pressure receiving liquid chambers 24 are arranged side by side across the axis line O.

The restriction passage 23 is provided among the ring member 20, the partition member 18, and the first attachment member 11. The restriction passage 23 directly connects the pressure receiving liquid chambers 24, and is not in communication with the main liquid chamber 16, the sub liquid chamber 17, and the orifice passage 22. A length and a cross-sectional area of the flow passage of the restriction passage 23 are set (tuned) so that a resonant frequency of the restriction passage 23 is a predetermined frequency. As the predetermined frequency, for example a frequency of an idle vibration, a shake vibration whose frequency is lower than that of the idle vibration, or the like can be listed.

The number of the restriction passages 23 may be one or more than one. In the case of more than one restriction passage, the resonant frequencies may be different from one another. Furthermore, a pair of restriction passages 23 may be provided so that the pressure receiving liquid chambers 24 are individually in communication with the sub liquid chamber 17, and the two pressure receiving liquid chambers 24 may be in communication with each other through the restriction passage 23 and the sub liquid chamber 17.

Here, the elastic division walls 25 are joined to the first-side elastic body 13 of the elastic bodies 13, 14, and are also in abutment with the second-side elastic body 14. The elastic division wall 25 protrudes from the first-side elastic body 13 toward the second-side elastic body 14, and the size thereof along the axis line O direction is gradually larger from the inner side to the outer side in the radial direction. An abutment surface 25a, of the elastic division wall 25, that faces the second side of the vibration damping device 10 is formed into a convex curved surface that convexes toward the second side of the vibration damping device 10, and is also in abutment with the formation surface 14a of the second-side elastic body 14. The size of the elastic division wall 25 along the radial direction is less than the size of the first-side elastic body 13 from the inner peripheral edge portion to the outer peripheral edge portion along the radial direction and is less than the size of the second-side elastic body 14 from the inner peripheral edge portion to the outer peripheral edge portion along the radial direction. An outer end portion of the elastic division wall 25 in the radial direction is joined to the coating film 11b. Note that the first-side elastic body 13, the elastic division walls 25, and the coating film 11b are integrally formed.

Here, as shown in FIG. 1, the second attachment member 12 is divided in the axis line O direction into: a first-side divided body (first divided body) 26 to which the inner peripheral edge portion of the first-side elastic body 13 is joined; and a second-side divided body (second divided body) 27 to which the inner peripheral edge portion of the second-side elastic body 14 is joined.

The second-side divided body 27 includes: a bottomed cylindrical main unit 27a; and an attachment unit 27b that protrudes toward the first side of the vibration damping device 10 from the main unit 27a. In an end portion of the main unit 27a on the first side of the vibration damping device 10, there is formed a circumferential groove 27c that opens toward the first side of the vibration damping device 10. An outer diameter of the portion of the main unit 27a at a position closer to the second side of the vibration damping device 10 than the central portion in the axis line O direction gradually decreases toward the second side of the vibration damping device 10.

The first-side divided body 26 is formed into a cylinder that opens toward both sides in the axis line O direction. The attachment unit 27b of the second-side divided body 27 is attached to an interior of an end portion of the first-side divided body 26 on the second side of the vibration damping device 10. The first-side divided body 26 and the main unit 27a of the second-side divided body 27 are spaced from each other in the axis line O direction. Between the two, there is provided an annular concave portion 28 that circumferentially extends.

As shown in FIG. 2 and FIG. 3, the first-side divided body 26 is provided with restriction portions 26a. They are formed by portions of the first-side divided body 26 at the same circumferential positions as those of the elastic division walls 25 being protruded outwardly in the radial direction. As shown in FIG. 2, the restriction portions 26a extend along the axis line O direction. In the illustration shown in the figure, the restriction portions 26a extend over the whole length of the first-side divided body 26 in the axis line O direction. A chamfer 26b is formed at an end portion of the restriction portion 26a on the second side of the vibration damping device 10 (the elastic division wall side of the restriction portion 26a along the axis line direction). The chamfer 26b extends gradually internally in the radial direction toward the second side of the vibration damping device 10. The chamfer 26b is formed into a convex curved surface that convexes toward the axis line O direction.

Here, the inner peripheral edge portions of the elastic bodies 13, 14 are located side by side in the axis line O direction. The inner peripheral edge portion of the second-side elastic body 14 is joined to an outer peripheral surface of the main unit 27a of the second-side divided body 27 and goes into the circumferential groove 27c. The inner peripheral edge portion of the first-side elastic body 13 is joined to a portion of an outer peripheral surface of the first-side divided body 26 at a position closer to the second side of the vibration damping device 10 than the central portion in the axis line O direction. The inner peripheral edge portion of the first-side elastic body 13 is joined to at least part of the restriction portions 26a. In the illustration shown in the figure, the inner peripheral edge portion of the first-side elastic body 13 is joined to the end portions of the restriction portions 26a along the axis line O direction from radially outward. Furthermore, the inner peripheral edge portion of the first-side elastic body 13 goes into the annular concave portion 28. The portion of the first-side elastic body 13 that goes into the annular concave portion 28 is, from the first side of the vibration damping device 10, in abutment with or close to the portion of the second-side elastic body 14 that goes into the circumferential groove 27c.

In the present embodiment, as shown in FIG. 2, the restriction portions 26a are arranged so as to overlap the radially inner end portions of the elastic division walls 25 in the axis line O direction. The restriction portion 26a sandwiches the radially inner end portion of the elastic division wall 25 between itself and the inner peripheral edge portion of the second-side elastic body 14. The restriction portion 26a together with the inner peripheral edge portion of the first-side divided body 26 sandwiches the radially inner end portion of the elastic division wall 25 between itself and the inner peripheral edge portion of the second-side elastic body 14 in the axis line O direction.

The vibration damping device 10 that is constructed as described above is a contraction (erect) type that is installed so that the main liquid chamber 16 is located on an upper side in the vertical direction and that the sub liquid chamber 17 is located on a lower side in the vertical direction.

In the case where the vibration damping device 10 is mounted in, for example, an automobile, the first attachment member 11 is joined to the engine as a vibration generating unit while the second attachment member 12 is joined to the body of the automobile as a vibration receiving unit via a bracket or the like which are not shown in the figure. In automobiles, a vibration along a longitudinal direction or a latitudinal direction of the body is likely to be input from the engine to the body. Therefore, the vibration damping device 10 is mounted so that a parallel direction in which the pressure receiving liquid chambers 24 are radially aligned across the axis line O coincides with, for example, the longitudinal direction or the latitudinal direction.

When a load in the axis line O direction is input to the vibration damping device 10 and the first attachment member 11 and the second attachment member 12 are relatively displaced in the axis line O direction, the second-side elastic body 14 that joins the attachment members 11, 12 is elastically deformed. This changes the main liquid chamber 16 in volume, and hence, the liquid moves back and forth between the main liquid chamber 16 and the sub liquid chamber 17 through the orifice passage 22. As a result, liquid column resonance is produced in the orifice passage 22, which causes the vibration at the frequency equivalent to the resonant frequency of the orifice passage 22 to be absorbed and damped.

When a load in the parallel direction is input to cause the first attachment member 11 and the second attachment member 12 are relatively displaced in the parallel direction, the elastic bodies 13, 14 and the elastic division walls 25 are elastically deformed. This changes the two pressure receiving liquid chambers 24 in volume, and hence, the liquid moves back and forth between the two pressure receiving liquid chambers 24 through the restriction passage 23. As a result, liquid column resonance is produced in the restriction passage 23, which causes the vibration at the frequency equivalent to the resonant frequency of the restriction passage 23 to be absorbed and damped.

As described above, according to the vibration damping device 10 of the present embodiment, the first-side divided body 26 is provided with the restriction portions 26a. Therefore, when a load is input in the axis line O direction and the attachment members 11, 12 are relatively displaced in the axis line O direction, it is possible to displace the radially inner end portion of the elastic division walls 25 in the axis line O direction while the radially inner end portion of each of the elastic division walls 25 is sandwiched between the restriction portion 26a of the first-side divided body 26 and the inner peripheral edge portion of the second-side elastic body 14. This makes it possible to prevent the radially inner end portion of the elastic division wall 25 and the inner peripheral edge portion of the second-side elastic body 14 from being spaced away in the axis line O direction, thus suppressing the production of a gap between the two. Therefore, it is possible to reliably exhibit the damping property.

Furthermore, the inner peripheral edge portions of the elastic bodies 13, 14 are located side by side in the axis line O direction. Therefore, it is possible to decrease the size of the radial end portion of the elastic division wall 25 along the axis line O direction, keeping the rigidity of the end portion in the axis line O direction low. As a result, when a load is input in the axis line O direction and the attachment members 11, 12 are relatively displaced in the axis line O direction, it is possible to reliably suppress the production of the gap.

Furthermore, the chamfer 26b is formed at the end portion of the restriction portion 26a on the side of the elastic division wall 25. Therefore, compared with the case where the chamfer 26b is not formed, it is possible to make it easy to secure the radial length of the first-side elastic body 13. As a result, it is possible to reliably exhibit the performance of the first-side elastic body 13 for a long period of time while the deterioration of the first-side elastic body 13 is being suppressed.

Furthermore, the restriction portions 26a are formed by the portions of the first-side divided body 26 at the same circumferential positions as those of the elastic division walls 25 being protruded outwardly in the radial direction. Therefore, it is possible to make it easy to secure the radial length of the first-side elastic body 13 in portions that avoid the same circumferential portions of the first-side divided body 26 as those of the elastic division walls 25. As a result, it is possible to reliably exhibit the performance of the first-side elastic body 13 for a long period of time while the deterioration of the first-side elastic body 13 is being suppressed.

In the present embodiment, an initial load is input to the second side of the vibration damping device 10 in an installation state of the vibration damping device 10. However, of the elastic bodies 13, 14, the first-side elastic body 13, which is located on the first side of the vibration damping device 10, is joined to the elastic division walls 25. Therefore, in the installation state, the radially inner end portion of the elastic division wall 25 and the inner peripheral edge portion of the second-side elastic body 14 are unlikely to be spaced away in the axis line O direction to form a gap between them. Thus, the aforementioned effect of suppressing the production of the gap is eminent.

The technical scope of the present invention is not limited to the aforementioned embodiment, and various modifications can be made without departing from the scope of the present invention.

For example, the chamfer 26b may not be provided.

Furthermore, in the aforementioned embodiment, the restriction portion 26a extends over the whole length of the first-side divided body 26 in the axis line O direction. However, the restriction portion 26a may not extend over the whole length.

In the aforementioned embodiment, the restriction portions 26a are formed by the portions of the first-side divided body 26 at the same circumferential positions as those of the elastic division walls 25 being protruded outwardly in the radial direction. However, the present invention is not limited to the aforementioned embodiment. For example, the first-side divided body may be formed so as to have a larger diameter than that of the main unit of the second-side divided body, and the outer peripheral portion of the first-side divided body may be used as a restriction portion that extends over the whole periphery in the circumferential direction.

In the aforementioned embodiment, the elastic division walls 25 are joined to the first-side elastic body 13, and are also in abutment with the second-side elastic body 14. However, the present invention is not limited to the aforementioned embodiment. For example, the elastic division walls may be joined to the second-side elastic body, and may also be in abutment with the first-side elastic body.

In the aforementioned embodiment, the liquid chamber 19 is defined into two pressure receiving liquid chambers 24. However, as long as it is defined as a plurality of divided liquid chambers, the present invention is not limited to the aforementioned embodiment. For example, three or more elastic division walls may be provided in a circumferentially spaced manner, to thereby define the liquid chamber into three or more pressure receiving liquid chambers. This makes it possible to effectively exhibit the damping property for the vibrations along a plurality of radial directions.

In the aforementioned embodiment, the orifice passage 22 and the restriction passage 23 produce liquid column resonance by the liquid flowing therethrough. However, the present invention is not limited to the aforementioned embodiment. However, for example, with the liquid flowing through, the vibration may be absorbed or damped by the viscous damping.

In the aforementioned embodiment, the contraction type has been shown as the type of the vibration damping device 10. However, the vibration damping device 10 may be a pendant type in which the device is installed so that the main liquid chamber is positioned on the vertically lower side and also that the sub liquid chamber is positioned on the vertically upper side of the vibration damping device 10.

The vibration damping device 10 according to the present invention is not limited to an engine mount for automobiles, but is applicable to uses other than the engine mount. For example, the vibration damping device 10 is applicable to a power generators mount installed in construction machines, or to a machine mount installed in plants or the like.

It is possible to appropriately replace the constituent elements in the aforementioned embodiment with known constituent elements without departing from the spirit or scope of the present invention. Furthermore, the aforementioned modifications may be appropriately combined.

INDUSTRIAL APPLICABILITY

In a vibration damping device that is applied to automobiles, industrial machines, and the like for absorbing and damping the vibration from a vibration generating unit such as an engine, it is possible to reliably exhibit the damping property.

BRIEF DESCRIPTION OF THE REFERENCE SYMBOLS

10: vibration damping device
11: first attachment member
12: second attachment member
13: first-side elastic body (first elastic body)
14: second-side elastic body (second elastic body)
19: liquid chamber
23: restriction passage
24: pressure receiving liquid chamber
25: elastic division wall
26: first-side divided body (first divided body)
26a: restriction portion
26b: chamfer
27: second-side divided body (second divided body)

The invention claimed is:
1. A vibration damping device, comprising:
a cylindrical first attachment member that is joined to one of a vibration generating unit and a vibration receiving unit, and a second attachment member that is joined to the other; and
an elastic body that joins the attachment members,
wherein the elastic body comprises: an annular first elastic body and an annular second elastic body that are spaced from each other in an axial direction,
a liquid chamber in which liquid is enclosed is formed between the elastic bodies, and a plurality of elastic division walls that divide the liquid chamber into a plurality of pressure receiving liquid chambers are arranged in a circumferentially spaced manner, the pressure receiving liquid chambers being in communication with one another through a restriction passage, the elastic division wall is joined to the first elastic body, and is also in abutment with the second elastic body, the second attachment member is divided in the axial direction into: a first divided body to which an inner peripheral edge portion of the first elastic body is joined; and a second divided body to which an inner peripheral edge portion of the second elastic body is joined, the inner peripheral edge portions of the elastic bodies are located side by side in the axial direction, the first divided body is provided with restriction portions to which the inner peripheral edge portion of the first elastic body is joined from radially outward, which are arranged so as to overlap a radially inner end of the elastic division walls in the axial direction, and the radially inner end of the elastic division wall is sandwiched between the restriction portions and an inner peripheral edge portion of the second elastic body, the second divided body is provided with a main unit and an attachment unit, the main unit being spaced from the first divided body in the axis line direction and forming an annular concave onion extending in a circumferential direction of the main unit between the main unit and the first divided body, and the attachment unit protruding toward the first divided body from the main unit and being connected to the first divided body, and an inner peripheral edge portion of the first elastic body is fitted into the annular concave portion.

2. The vibration damping device according to claim 1, wherein the restriction portions extend in the axial direction, and the inner peripheral edge portion of the first elastic body is joined to an end portion of the restriction portions on an elastic division wall side of the restriction portions along the axial direction, and a chamfer is formed at the end portion of the restriction portions on the elastic division wall side of the restriction portions.

3. The vibration damping device according to claim 1, wherein the restriction portions are formed by a portion of the first divided body at a same circumferential position as that of the elastic division wall being protruded outwardly in a radial direction.

* * * * *